US009382067B2

(12) United States Patent
Gropper

(10) Patent No.: US 9,382,067 B2
(45) Date of Patent: Jul. 5, 2016

(54) ENERGY EFFICIENT REMOTE VOLUMETRIC SENSING, REPORTING AND ANALYSIS SYSTEM

(71) Applicant: Daniel R. Gropper, Vienna, VA (US)

(72) Inventor: Daniel R. Gropper, Vienna, VA (US)

( * ) Notice: Subject to any disclaimer, the term of this patent is extended or adjusted under 35 U.S.C. 154(b) by 171 days.

(21) Appl. No.: 14/189,499

(22) Filed: Feb. 25, 2014

(65) Prior Publication Data

US 2014/0240084 A1    Aug. 28, 2014

Related U.S. Application Data

(60) Provisional application No. 61/769,446, filed on Feb. 26, 2013.

(51) Int. Cl.
| | | |
|---|---|---|
| G05B 23/02 | (2006.01) | |
| G08B 1/00 | (2006.01) | |
| G06Q 10/00 | (2012.01) | |
| B65F 1/14 | (2006.01) | |

(52) U.S. Cl.
CPC .............. *B65F 1/1615* (2013.01); *B65F 1/1607* (2013.01); *B65F 1/1473* (2013.01); *B65F 2210/128* (2013.01); *B65F 2210/148* (2013.01); *B65F 2210/1443* (2013.01); *B65F 2210/168* (2013.01); *B65F 2240/1562* (2013.01); *Y02W 30/64* (2015.05)

(58) Field of Classification Search
CPC ................... B65F 2210/128; B65F 2210/168; G06F 1/3206; G06F 2201/875; H04W 4/005; H04L 43/04; H04L 63/123; H04L 41/0853; H04L 43/065; G03G 2215/00109; G06Q 10/20; G08B 25/10; G01F 23/0061

USPC ................ 340/3.1, 531, 506, 539.1, 539.26, 340/539.22; 707/102, 10; 709/206, 229, 709/238
See application file for complete search history.

(56) References Cited

U.S. PATENT DOCUMENTS

| | | | |
|---|---|---|---|
| 6,839,717 B1 | 1/2005 | Motoyama et al. | |
| 7,124,680 B2 | 10/2006 | Poss et al. | |
| 7,481,159 B2 | 1/2009 | Poss et al. | |
| 8,135,817 B2 | 3/2012 | Motoyama | |
| 2008/0067227 A1 | 3/2008 | Poss et al. | |
| 2008/0133578 A1* | 6/2008 | Motoyama .......... | G06F 11/3495 |
| 2011/0134917 A1* | 6/2011 | Glenn ................. | G08B 25/10 370/389 |
| 2011/0137484 A1* | 6/2011 | Poss ...................... | A47G 29/22 700/295 |
| 2014/0101058 A1* | 4/2014 | Castel ................... | G06Q 10/20 705/305 |
| 2014/0277795 A1* | 9/2014 | Matsuoka ............. | G06Q 50/06 700/291 |

OTHER PUBLICATIONS

"smartbin" recycling and general waste product brochure from www.smartbin.com, printed Apr. 9, 2014.

* cited by examiner

*Primary Examiner* — Mizra Alam
(74) *Attorney, Agent, or Firm* — Dority & Manning, P.A.

(57) ABSTRACT

A system for remote volumetric sensing, reporting, analysis, and alerting utilizing linear distance sensing, an electronic messaging communications protocol, a digital data transmission protocol, an automated data message reading and distribution system, an interactive web site user interface for both accessing user data and reviewing, remotely administering and configuring an automated remote sensor analysis and reporting system with integrated monitoring and alerting functions.

40 Claims, 11 Drawing Sheets

FIG. 8

ENERGY EFFICIENT REMOTE VOLUMETRIC SENSING, REPORTING AND ANALYSIS SYSTEM

CROSS REFERENCE TO RELATED APPLICATION

The present application claims filing benefit of U.S. Provisional Patent Application Ser. No. 61/769,446 having a filing date of Feb. 26, 2013, which is incorporated by reference herein in its entirety.

BACKGROUND OF THE INVENTION

For years, solid waste removal and transport has generally required the waste removal provider to expend time, money, and resources, to physically access the receptacle in order to determine whether any material is ready to be removed from the receptacle's location. The same issues apply to all types of materials collected at a location. This is a terribly inefficient use of precious resources, usually including burning nonrenewable fossil fuels with the resulting adverse environmental impact, especially when the physical inspection of the receptacle reveals little or no material to be retrieved. Alternately, when a receptacle is filled to, or beyond capacity, and is not inspected, great consternation is caused to the material creator that the expected and contracted levels of service are not being provided by the solid material servicing company.

Through the years many attempts have been made to remotely sense material volume in remote receptacles in order to provide information to the material recovery provider about the current status of material in the remote receptacle. These attempts have often failed to provide adequate, cost effective, reliable, simple technological and/or scalable solutions to the remote sensing challenges. An ongoing challenge is the requirement to provide cost effective power for the remote reporting functions of the remote sensor system.

One company, SmartBin, offers a number of solutions for the remote volumetric monitoring of bins. http://www.smartbin.com Amongst other problems with applying these SmartBin sensors to indoor applications is their requirement to utilize cell phone infrastructure to report each bin's status to the central location. Without expensive and complex special technical infrastructure, many typical offices and buildings do not have adequate cell phone coverage to permit these systems to operate effectively. Often additional and expensive engineering and equipment is needed to provide cell phone coverage within buildings. Generally, cell phone carriers charge monthly fees for providing service in addition to charging usage charges based on the amount and frequency of data transmission through their system. In order for the remote material sensing system to be engineered and manufactured in a cost effective, and economically scalable manner it is very important for installation of the sensors to be able to be performed quickly and easily by workers without extensive technical training or background and must use, to the maximum extent possible, existing infrastructure with no additional monthly or usage charges.

Another company, Big Belly Solar, http://bigbellysolar.com/, has U.S. patents for solar operated smart recycling, mailing and compacting bins. These include U.S. Pat. No. 7,124,680 to Poss, and U.S. Pat. No. 7,481,159 to Poss. These disclosures are primarily based on outside located, solar recharged, bin monitoring systems. As with the SmartBin disclosure above, BigBelly appears to use cellular telephone service to transmit data which has a monthly cost and does not work well within many inside building situations. Solar recharging does not work well with inside fluorescent lights as the light frequency is generally not compatible with standard photovoltaic cells for use in charging batteries from sunlight. One report from a Big Belly customer noted that the cost per receptacle was between $700 and $3,700 dollars, or over 37 times the cost of a normal wire waste receptacle. The cost factor alone would be extremely prohibitive in the highly competitive and commodity driven, for example, shredded paper recycling business, as well as for the collection and or storage of other similar material recovery businesses. For these reasons alone, the Big Belly technology is not acceptable for inside the office remote sensing.

Other systems use mechanical sensors with moving parts that require expensive and/or time consuming maintenance. To be successful, a sensor must be able to be easily installed, often without tools, quickly and easily, in existing receptacles. There must be no moving parts that require service and there can be no hardwired connections for power or communications services. Mechanical sensors, such as the SmartBin system would not meet the cost, functionality and scalability requirements of a successful remote sensor system.

BRIEF DESCRIPTION OF THE INVENTION

As will be taught herein, although the basic concept of remote sensing is old and well known in the field, a remote sensing system that is easy to install and operate, provides significant system diagnostics, operates on existing communications infrastructure without additional infrastructure development, is not connected by hard line to power and communications systems, and is low cost to produce and operate, provides many engineering specifications and challenges that are not taught by current sensor systems.

An object of the instant invention is to provide a low cost remote sensor system that utilizes existing communications infrastructure that is easy and cost effective to operate and maintain.

Another object of the instant invention is to provide a low cost remote sensor system that has no moving parts.

Another object of the instant invention is to provide a low cost remote sensor system that is not connected to power by hard line.

Another object of the instant invention is to provide a low cost remote sensor system that is intermittently connected to wireless communications systems to send electronic messages.

Another object of the instant invention is to provide a low cost remote sensor system that is easy to install, preferably without tools.

Another object of the instant invention is to provide a low cost remote sensor system that senses the linear distance between the top of a material receptacle and the top of the stack of material contained within the receptacle.

Another object of the instant invention is to provide a low cost remote sensor system that has a manual test switch for starting a scan cycle and accessing a setup menu.

Another object of the instant invention is to provide a low cost remote sensor system that has a door open sensor.

Another object of the instant invention is to provide a low cost remote sensor system that is battery operated with a long battery life span.

Another object of the instant invention is to provide a low cost remote sensor system that where the linear distance detection is by infrared frequency and analog to digital analysis.

Another object of the instant invention is to provide a low cost remote sensor system that sends the sensed data by SMTP format to a remote server.

Another object of the instant invention is to provide a low cost remote sensor system that has diagnostics to sense battery voltage.

Another object of the instant invention is to provide a low cost remote sensor system that has diagnostics that detect each step in the WiFi connection process to the WiFi access point.

Another object of the instant invention is to provide a low cost remote sensor system that outputs system diagnostics as serial data.

Another object of the instant invention is to provide a low cost remote sensor system that outputs system diagnostics through a USB connection.

Another object of the instant invention is to provide a low cost remote sensor system that utilizes WiFi security protocol such as WPA2 encryption.

Another object of the instant invention is to provide a low cost remote sensor system that stores the hex key from the WPA2 connection for faster connection cycle time to a WiFi access point to save battery life.

Another object of the instant invention is to provide a low cost remote sensor system that has a nonvolatile memory to store sensor settings.

Another object of the instant invention is to provide a low cost remote sensor system that has a nonvolatile memory for sensor readings.

Another object of the instant invention is to provide a low cost remote sensor system that has a microcontroller for software control of the sensor and communications functions.

Another object of the instant invention is to provide a low cost remote sensor system that has field flash software upgrade capability.

Another object of the instant invention is to provide a low cost remote sensor system that has a sleep mode to save power when not actively sensing or in communicating modes.

Another object of the instant invention is to provide a low cost remote sensor system that has a real time clock for setting activation days and times with nonvolatile settings.

Another object of the instant invention is to provide a low cost remote sensor system that has diagnostics for each step in sending each SMTP message.

Another object of the instant invention is to provide a low cost remote sensor system that has a watchdog timer to prevent the sensor system from hanging up in data acquisition and transmission functions.

Another object of the instant invention is to provide a low cost remote sensor system that utilizes an automatic SMTP email reading, distribution and storage system.

Another object of the instant invention is to provide a low cost remote sensor system that has a secure and interactive web interface with user login and roles so users can only access authorized information.

Another object of the instant invention is to provide a low cost remote sensor system that can automatically find all sensors with data that have not been linked with a location in the system.

Another object of the instant invention is to provide a low cost remote sensor system that has a unique identifier for each sensor in the system.

Another object of the instant invention is to provide a low cost remote sensor system that has the ability to remotely assign each sensor to a location.

Another object of the instant invention is to provide a low cost remote sensor system that can create a unique client identifier for each client.

Another object of the instant invention is to provide a low cost remote sensor system that can create locations linked to each client with all client and location information.

Another object of the instant invention is to provide a low cost remote sensor system that utilizes XML files to store and process data.

Another object of the instant invention is to provide a low cost remote sensor system that can create reports for the latest reading of all sensors at a location.

Another object of the instant invention is to provide a low cost remote sensor system that can provide a detailed report history of all readings for a sensor.

Another object of the instant invention is to provide a low cost remote sensor system that can issue alerts based on battery voltage, receptacle material fill status, button press, and/or door sensor.

Another object of the instant invention is to provide a low cost remote sensor system that has a magnetic reed door sensor.

Another object of the instant invention is to provide a low cost remote sensor system that can output data into other systems for process coordination, route scheduling, and further business process analysis.

Another object of the instant invention is to provide a low cost remote sensor system that can automatically create routing and action reports to pick up material.

Another object of the instant invention is to provide a low cost remote sensor system that can create analytical reports based on received data.

Another object of the instant invention is to provide a low cost remote sensor system that can automatically manage stored data in the system, deleting and archiving data as needed.

Another object of the instant invention is to provide a low cost remote sensor system that store each input in a separate XML field for further processing.

Another object of the instant invention is to provide a low cost remote sensor system that has a battery boost circuit to extend battery life.

Another object of the instant invention is to provide a rechargeable battery, preferably a sealed lead acid battery.

Another object of the instant invention is to provide an efficient battery voltage regulator that will lower the battery voltage to the board level voltage and will shut down automatically if current is not currently required.

Another object of the current invention is to provide a structural support mechanism to enable the batteries to easily be changed in the field without tools.

Another object of the instant invention is to provide a power connected that can easily accept power from multiple sources and be easily changed in the field.

In accordance with one embodiment of the present disclosure, a low power remote consumption volumetric sensing and reporting system is disclosed. The system includes at least one linear sensing device with an electronic output, a battery source of voltage electrically connected to said linear sensing device, and a microcontroller for processing said electrical output from said linear sensing device. The system further includes a non volatile memory connected to said microcontroller for storing settings and sensor readings, and a low power WiFi connection device connected to said microcontroller for intermittently transmitting the analyzed linear sensed data wherein each WiFi sensor has a unique identification number. The system further includes a storage receptacle for receiving and storing material having an input area for receiving material, said storage receptacle defining an area for containment of material input into said storage receptacle. The linear sensing device is connected to a top of said storage receptacle and said linear sensing device measures a linear distance between a top of said material in said storage receptacle and said top of said storage receptacle. The system further includes a WiFi access point for intermittently connecting to said low power WiFi connection device for receiving said analyzed linear sensed data, a server electronically connected to said WiFi access point for receiving said analyzed linear sensed data, a post office computer program application running on said server that automatically receives said analyzed linear sensed data and stores said sensed data on said server for additional processing, and an interactive web interface electrically connected to said server for selecting, analyzing and displaying said analyzed linear sensed data in a user defined graphical interactive format.

Aspects and advantages of the invention will be set forth in part in the following description, or may be obvious from the description, or may be learned through practice of the invention These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 is a screen shot of an interactive web interface login screen.

FIG. 9 is a screen shot of an interactive web interface portal screen once a user has successfully logged in.

DETAILED DESCRIPTION OF THE INVENTION

Figure 1:
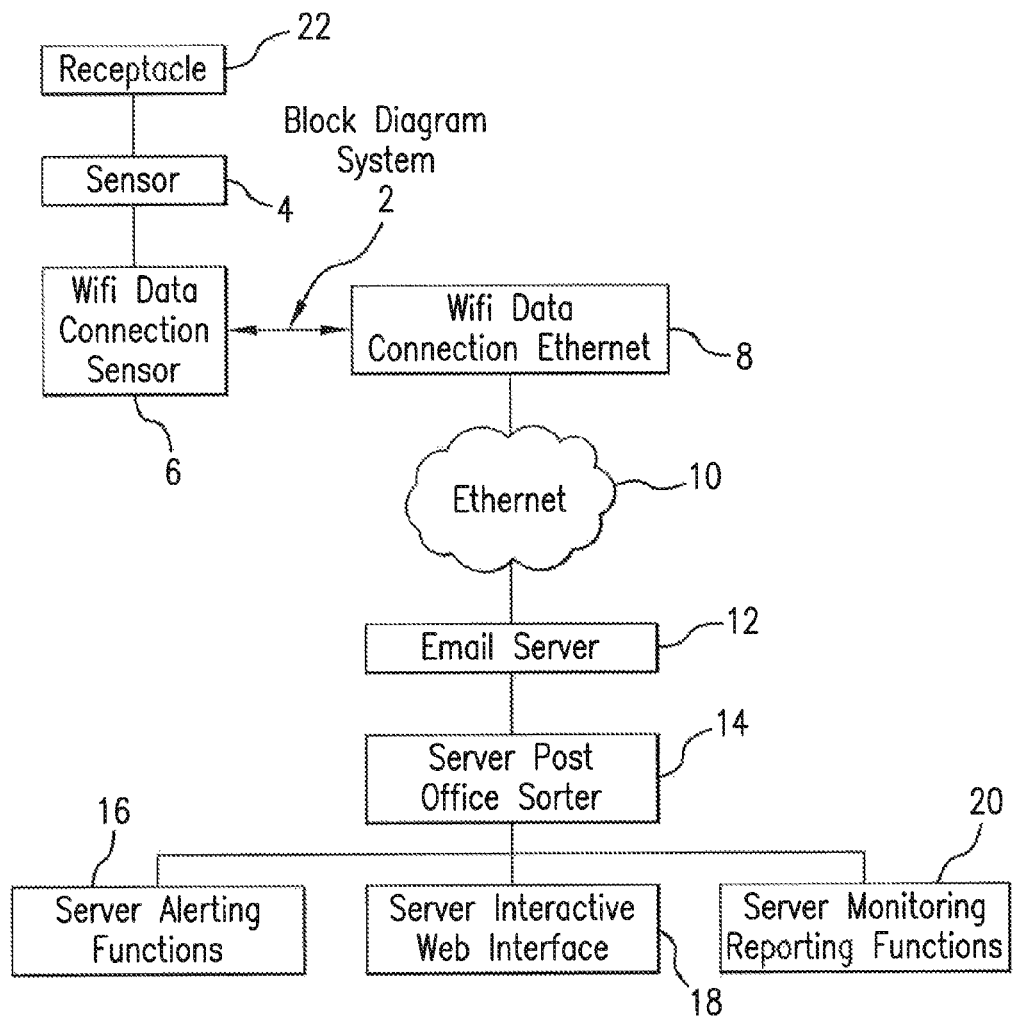
FIG. 1 is a high level block diagram of the invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
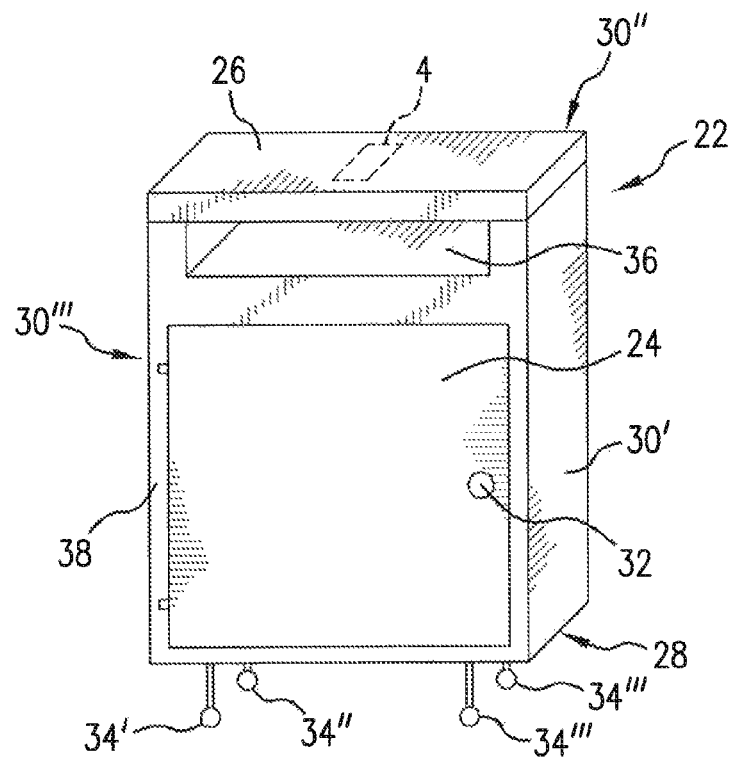
FIG. 2 is a drawing of a perspective view of a representative console receptacle.
Figure 3:
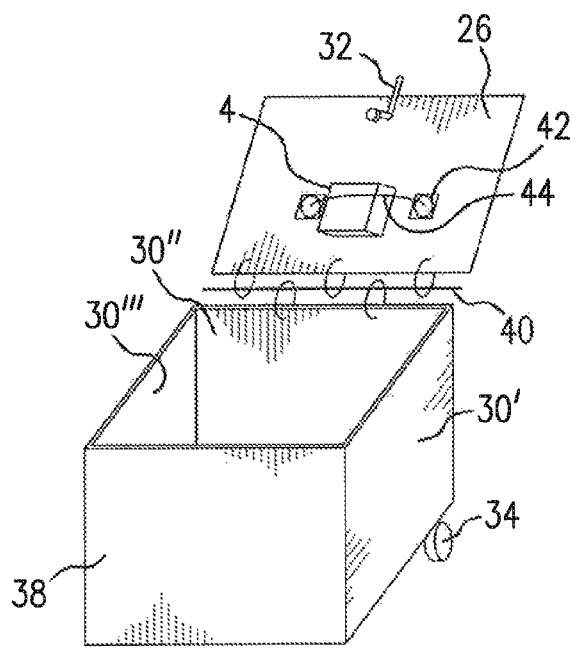
FIG. 3 is a drawing of a perspective view of a representative bin receptacle.

FIG. 1 is a block diagram of the low power remote sensing system, generally 2, described and taught herein. A component of the system will be container or receptacle 22, as shown in FIG. 2 or 3, which can be in a wide variety of sizes and shapes. For the purposes of this disclosure, a standard receptacle 22 for paper to be shredded will be described, as shown in FIG. 2, although it is noted that sensor 4 described herein may be affixed to many different kinds and configurations of receptacles 22, including those with locking doors 24, or having a hinged top 40, as shown in FIG. 3, common to many waste receptacles, or even to receptacles not having a top or the ability to completely close.

The main engineering requirement is that sensor 4 must run for long periods of time on self-contained low voltage power, such as batteries 58 as, in use, receptacles 22 cannot be connected to wired power and must remain mobile as most receptacles 22 will usually be located inside office buildings usually having fluorescent lights. Attempting to charge batteries 58 will not be successful as the light frequency of fluorescent lights is generally not supportive of the light frequencies required to operate photovoltaic cells.

While sensor 4 taught herein may be used with many different types of receptacles 22, it would be helpful to describe the features of a typical receptacle 22 and describe how these features impact the engineering requirements of sensor 4. As shown in FIG. 2, a receptacle 22 will usually be an intermittently locked receptacle in order to maintain the security of the material contained within receptacle 22. Such a receptacle 22 will generally have a top 26, a bottom 28, and generally three sides 30', 30" and 30'", rigidly connected between top 26 and bottom 28. In some configurations, as shown in FIG. 3, a hinged door 24 will be rotatably connected to at least one side, such as 30", for intermittent opening and closing. Locking mechanism 32, connected to door 24 will usually intermittently engage a side, such as 30' when in the locked configuration to prevent gaining access to the stored material in receptacle 22 when in a locked status.

As shown in FIG. 3, instead of having a hinged door 24, a common alternate receptacle 22 configuration is with a fixed front panel 38 having a hinged and locking top 26 in place of fixed top 26. As shown in FIG. 2, the locking mechanism is usually disposed between hinged top 26 and front side 38.

Many receptacles 22 have wheels, shown by 34', 34", 34'" and 34"" affixed to bottom 28 to permit receptacle 22 to be easily moved to a location for loading, unloading, storage and use. It is because a design requirement is that receptacle 22 be mobile, that any sensor 4 must be powered without any wire connection to an external power source and any data transmission be by WiFi 8.

A feature of most receptacles 22 will be slot 36, which is formed in many different manners depending on the size and shape of the material to be placed into receptacle 22. Slot 36 is often either disposed in the front 38 panel, which is connected to sides 30' and 30", or in top 26. Slot 36 will be sized to be able to receive material, but also to prevent easy access to the material stored in receptacle 22, whereby material in receptacle 22 can only easily be retrieved from receptacle 22 by either opening lock 32 and door 24, as shown in FIG. 2, or similarly opening lock 32 and top 26, as shown in FIG. 3.

Figure 12:
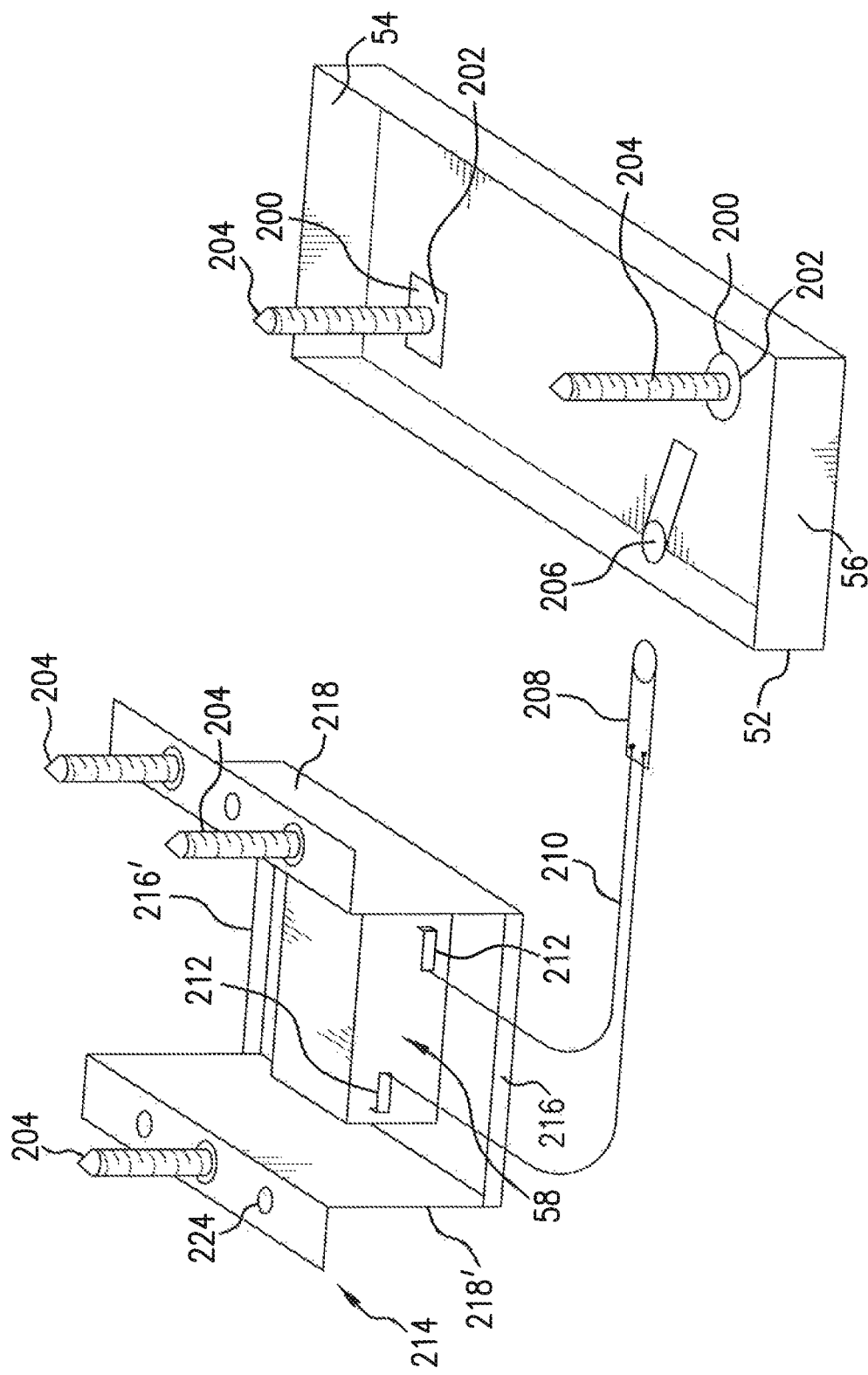
FIG. 12 is a perspective drawing of the battery shelf, battery, battery connector and mounting mechanisms for the sensor.

Usually sensor 4 will be attached to the inside top 26 of receptacle 22. The physical attachment may be by any now known or future means, but an efficient means of connection is through the use of industrial strength hook and loop material 46, commonly known as Velcro®, where one part is affixed to sensor 4 and the mating other section is affixed to the inside top 26 of receptacle 22. As shown in FIG. 12, preferably, sensor 4 should be configured with mounting holes 200 disposed in sensor 4 pcb. Mounting holes 200 should be disposed in axial alignment with mating holes disposed in sensor case 202. In this configuration, mounting screws 204 can be passed through holes in cases 202, though aligned holes in pcb 200, and then screwed into inside top 26 of receptacle 22. In many instances receptacle 22 is made from composite wood and self tapping commonly available composite woods screws 200 will easily and securely mount sensor 4 to receptacle 22. Mounting of sensor 4 to receptacle 22 can be accomplished in seconds with standard tools such as power screwdriver drills by non highly skilled personnel.

In units where top 26 of receptacle 22 is hinged, additional tie downs 42 may be affixed to top 26 or receptacle 22 by means such as a pop rivet to hold the tie down 42 to top 26. Materials, such as plastic wire ties, commonly known as tie-wraps 44, can be placed through tie downs 42 and around sensor 4, thereby further physically securing sensor 4 to top 26, as shown in FIG. 3. As indicated above, mounting screws 200, with mating vibration resistant nuts, such as nylon insert nuts, can be used to mount sensor 4 to plastic topped receptacles 22. Additional standard mounting hardware, such as backing plates and washers, can be used to insure a secure connection of sensor 4 to receptacle 22. This is especially important to maintain sensor 4 in contact with top 26 in instances where receptacle 22, as shown in FIG. 3, is emptied by hydraulic mechanical means where receptacle 22 is flipped upside down at great force and top 26 generally slaps into an open position for emptying the material stored in receptacle 22.

An important consideration for placement of sensor 4 within receptacle 22 is that sensor 4 is physically out of the path of any material being inserted into receptacle 22, for example through slot 36, so that the material does not contact sensor 4 on its path into receptacle. Furthermore, sensor 4 should be placed at a location, for example, on top 26 that will prevent unauthorized access to sensor 4 from the outside of receptacle 22, thereby utilizing the existing securing features, such as lock 32 and door 24, to secure sensor 4, at the same time, permitting easy access to sensor 4 by authorized personnel who have unlocked lock 32 and opened door 24. In this manner batteries 56 and data through communication port 80, can be easily accessed by authorized personnel.

The location of sensor 4 should be such that infra red transmitter 96 and infra red receiver 98 are aimed at a central position of the material stored in receptacle 22 to be able to measure the linear distance between these two points. In one embodiment, transmitter 96 and receiver 98 are disposed through the bottom face of case bottom 52 and depend downwardly from the bottom of PCB 56 for ease and cost effectiveness of sensor 4 assembly and manufacture. It will be understood that many types of cases 52, 54 and sensor devices, now known or hereinafter invented, such as sonar and laser, can be used as required by the types of material placed in receptacle 22 and the physical requirements thereof.

Figure 4:
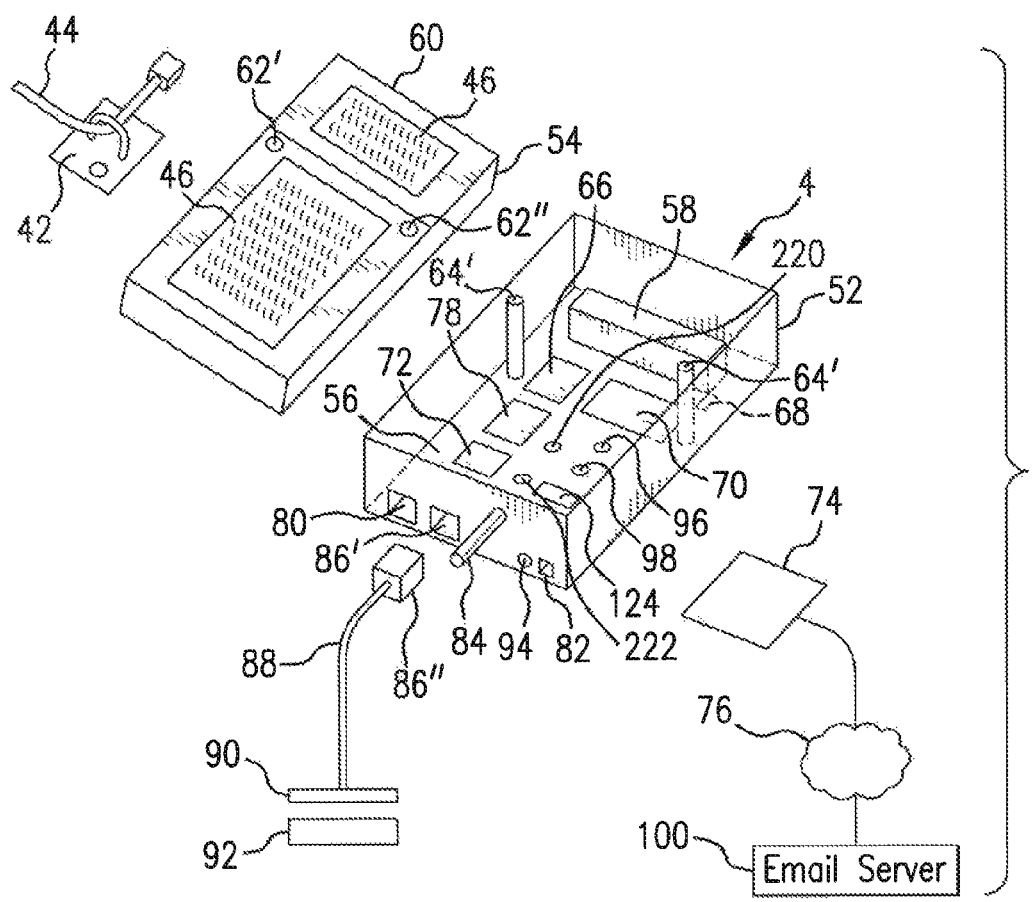
FIG. 4 is a perspective view of the sensor, mechanical connections, door sensor, WiFi access point and email functions.

Referring to FIG. 4, sensor 4 is shown generally. Although there can be many variations to the nature and design of sensor 4 depending on application and engineering requirements, a representative sensor 4 with its core features is shown and described herein. To be commercially and technologically successful, sensor 4 must be inexpensive to manufacture, be able to withstand a rugged physical environment and be easy to set up and operate.

A case to protect and support sensor 4 can be, for example, a fire resistant PVC plastic case having bottom 52 and top 54 which mate with interlocking ridges for added structural security. Sensor 4 may be mass manufactured on a PCB 56 that is configured to be securely affixed within case bottom 52 by such means as screws or silicon sealer to absorb vibration.

Sensor 4 is preferably battery powered and therefore may require at least one battery 58, or in the alternative, have a power receptacle 206. The battery power can be of any standard, low cost type, now known or hereinafter developed. It has been found that AA sized alkaline or lithium ion batteries can provide power for this type of application wherein there is ready access to sensor 4 by service personnel. In instances where sensor 4 has internal batteries, case top 54 should preferably have a sliding battery access door to permit easy and secure access to battery 58 without having to separate case bottom 52 from case top 54 to change the batteries. It is noted that many different types of battery door 60 and case bottom 54 and top 54 configurations can be successfully used for sensor 4. Case top 54 can be attached to case bottom 52 through screws 62', 62" through a mating hole in case top 54 to screw holes 64', 64" in case bottom 52.

The key to successful, secure, long term, low maintenance remote sensing is inexpensive and rugged battery power configurations. After trying numerous standard AA sized battery configurations with standard and new style alkaline and lithium battery configurations and voltages, it became apparent, at least at the current state of the battery technology, that such configurations will not easily be successful in commercial practice. Furthermore, having to access and service batteries located in sensor case 52, 54 presented numerous security issues and permitted unnecessary risk to sensor 4 integrity and operations.

At a minimum, AA size battery configurations create an environmental hazard of disposal of the used batteries. The placement of the batteries in sensor case 52, 54, and replacement of the batteries in the sensors 4 in the field, proved very problematic in actual operations. The battery change operations took too much time and the wear and tear on sensor 4 components also proved commercially challenging, which decreased the life and integrity of sensor 4. Such a configuration leads to faster failure of both the business model and sensors 4 over time.

After much experimentation, a number of facts on long term battery life and maintenance became apparent. Each of the following engineering and business operational factors are interrelated and were required to be addressed for successful implementation of battery power for sensor 4.

It is now common practice for electronic components on pcb boards that will run on battery power to run at 3.3 volts DC (VDC). In testing, even with voltage boost systems that could boost the battery voltage from 2 VDC to 3.3 VDC, the expected long term battery life did not occur. While technologically feasible, this approach failed in practice, It was determined that it would be better engineering practice to start with a battery with a high starting voltage, for example 12 VDC or 7 VDC, and use an efficient buck voltage regulator that would convert the higher voltage to the sensor's 4 required 3.3 VDC. An efficient voltage regulator would be smart and would shut itself down to further conserve battery power when sensor 4 went into its sleep mode, which is 99% of the time. Such buck voltage regulators are commonly available and are made by companies such as Analog Devices.

Further, mechanically separating battery 58 from sensor 4 and providing an industrial standard power connector 208 enables battery 58 to easily be changed in the field with no tools, while preserving the physical integrity of sensor 4. Additionally, with a standard power connector 208, such as a 2.1 mm center positive barrel power connector, sensor 4 could also be easily powered from wall transformer and other power sources where the application requirements would permit such a connection, without any alteration to sensor 4. In this configuration, battery 58 is connected to battery power cable 210 via crimp, or other types of connectors, 212. Preferably power connector 208 should be integrally formed and permanently connected to power cable 210. Power cable 210 can be any reasonable length as required by the application, but care should be give to make sure power cable 210 is not disposed in a manner that would interfere with material being deposited in receptacle 22 through slot 36. Crimp connections 212 should securely mechanically and electrically connect battery 58 terminal to power cable 210 Heat shrink crimp connectors perform this connection function especially well.

Sealed lead acid (SLA) batteries are commonly available, relatively inexpensive, rugged, safe, and perhaps most importantly easily rechargeable from standard inexpensive smart chargers. These chargers are plugged in to commercial power, or perhaps solar power to be more environmentally efficient, connected to the battery with simple clips, or through a power receptacle 206, and battery 58 is charged. No special procedures are required to recharge these SLA. The smart chargers automatically throttle back their charge rate as battery 58 charges to prevent overcharging and damage to the battery.

It is for these operational features that these batteries have been traditionally used in long life, low maintenance alarm systems. Perhaps, most importantly, not only do rechargeable batteries make economic sense, but they prevent the hazardous material disposal issues presented by the AA alkaline and lithium batteries. The SLA batteries are safer than the lithium batteries which have had a recent engineering history of fire issues in large applications such as airplanes. It is for this reason that lithium batteries are not permitted on airplanes, which would cause additional logistical issues for the deployment of batteries 58 and sensors 4.

To complete the effective installation of sensors 4, a separate, rugged battery shelf 214 was designed. Shelf 214 physically protects battery 58 and, with integral front and back lips 216, 216' and sides 218, 218', maintains battery 58 in place in receptacle 22 while in use. Shelf 214 can be securely screwed to receptacle top 26 utilizing screw holes 224.

Battery shelf 214 is configured to enable sensor 4 service person to access and replace the battery with just fingers with no tools required. Battery 58 is grasped between service person's thumb and index fingers and is lifted up and over lip 216. Battery power connector 208 is slidably removed from power receptacle 206. The process is quickly reversed with a charged battery 58. Thus changing battery 58 is fast, efficient and safe.

Servicing personnel will know which batteries 58 need to be changed as part of the servicing order as the battery voltage is detected with each sensing routine and is automatically transmitted as part of each report 168.

The electronics of sensor 4 must be configured to run on as little current as possible to prolong battery 58 life to increase the time between required battery changes as much as possible to increase efficiency and reduce the time and cost of battery changes to keep sensor 4 in operation.

An important element in sensor 4 power management is microcontroller 66. This microcontroller 66 should be chosen to be able to idle at a very low current rate in the micro amp range. Firmware should turn off all peripheral features, both within microcontroller 66 and on PCB 56 circuit any time they are not required to be using current. Firmware in microcontroller 66 should be able to easily be field flash programmable through, for example, RJ45 socket 68. Programming socket 68 should be disposed to be able to be accessible through battery compartment door 60, or other case orifice, so case top 54 does not need to be separated from case bottom 52 in order to field reflash microcontroller 66 firmware.

Microcontroller 66 should preferably have an external, non volatile flash memory 70 to store settings and sensor readings.

Many different communication types and devices can be used in sensor 4, as now known or hereinafter developed. A very common communication method in use today is WiFi 72, generally, and using the 802.11b/g/n protocols to send wireless data through internet 76. With the growing popularity of WiFi 72, there are many more accessible WiFi access points 74 located throughout the world that connect to the worldwide internet, shown generally as 76.

WiFi 72 has many advantages over other communications systems, such as cell phones, that have been used in prior art remote monitoring systems. These include that WiFi 72 generally has no individual connection monthly access charge or usage charges, as does most cellular systems. It is very common for buildings to be wired with wireless access points 74, but not with cellular systems due to the complexity and expense of cellular systems, and the very real issues of creating cellular interference without close coordination with the cellular carrier or carriers.

WiFi 72 has another advantage of enhanced WiFi security, such as WPA2, that can secure the authentication between WiFi 72 on sensor 4 and access point 74. WiFi access point 74 has a name identifier called a SSID. The SSID ID, combined with the access point 74 password, creates a hex key. To cut down on connection time, and hence time for power consumption for data transmission, after the first successful WiFi 74 connection event, the hex key can be recovered by microcontroller 66 firmware and automatically stored in eeprom 70 to speed future connections to the same access point 74. Firmware should automatically clear and re-write the hex key in case the connection is either not successful or has otherwise changed. It is important that every event in the firmware be self correcting for changed conditions to the greatest extent possible to make sensor 4 communications as automated as possible.

Firmware should be created to permit sensor 4 to act as a self troubleshooting device. A serial data interface, such as a USB controller 78, can be connected to microcontroller 66 and also to USB receptacle 80. Firmware should be developed to have each step in the WiFi connection process, from WiFi unit 72 to WiFi access point 74, be output as serial data from microcontroller 66 to USB interface 78 to USB connection 80. This in turn can be interfaced to most standard computers and is especially useful when the computer is running serial interface software as described later herein. In this manner sensor 4 is able to pinpoint each step in the WiFi 72 connection process and errors are automatically identified for diagnostic purposes.

Further, sensor 4 should have a sound device, such as a simple piezo buzzer 220 to provide audible confirmation of the state of sensor 4's operational status. Different beep sequences can be provided by microcontroller 66 to give an audible indication that, for example, sensor 4 has power, variable have been loaded and are ready, the email sequence has begun, and also that the email sequence has terminated, and indicate whether it has terminated successfully or unsuccessfully. Buzzer 220 operations can also be coordinated with LED 94 flashes to provided detailed optical indications of WiFi 72 connection status and success. These include whether a DHCP IP address has been allocated to sensor 4, whether sensor 4 is connected to WiFi 72 access point, whether data is being successfully transmitted on the WiFi 72 access point through TCP/IP and other data status indications. These visual flashes should be able to be disabled in the settings if needed to preserve power if required for proper operation of sensor 4.

Sensor 4 should also have a power switch 82 to stop all current from battery 58 from draining when sensor 4 scanning and communications functions are not in operation. Cycling power on switch 82 will reset and reboot the firmware in microcontroller 66 when needed. Firmware can be developed to have microcontroller 66 enter a menu set up mode through USB port 80 to configure WiFi 72 and other sensor 4 operations. In the alternative, the power switch can be deleted where the power is connected by power connector 208 to power receptacle 206 wherein microcontroller 66 can be reset by disconnecting and reconnecting power connector 208. A menu button 222 can be added to access the menu settings. Pressing menu button 222 resets sensor 4 to all default settings, which can enable a field reset of sensor 4 without requiring the use of any tools.

Many peripheral inputs to microcontroller 66 can be added including momentary switch 84. Momentary switch 84 can be configured in firmware to initiate a scan routine and send an alert message. This feature is especially useful while configuring and troubleshooting sensor 4 features and operations. Many operational plans require a positive confirmation of 'touch' of sensor 4, which is the equivalent of the old fashioned guard station key locations to ensure that an area has been checked by the guard during his rounds. The confirmation of button press is reported in the alert report 170.

Door switch system 90, 92 can be connected to microcontroller 66 to automatically detect door opening activity. This might include a set of mating connectors 86' and 86", a door switch wire 88 and a reed door switch 90. When door switch 90 is removed from proximity from door switch magnet 92, door reed switch 90 sends an electronic signal to microcontroller 66 to activate preprogrammed sensor 4 and messaging firmware. As door switches will not be used in all settings, mating connectors 86' and 86" should be preferably electronically mateable, but not permanently connected.

One or more LED 94 signaling lights can be connected to microcontroller 66 to indicate various firmware status activities, such as successfully sending a WiFi 72 message.

All of the peripheral units should be connected to microcontroller 66 in ways to limit the monitoring current to the greatest extent possible in order to preserve battery 58 life.

The actual sensors to determine the amount of material in receptacle 22 can be of many types including sonar, infra red, and or weight sensing etc. The key considerations are cost, battery power required, and the nature of the material to be sensed. In a closed receptacle, a matched wavelength set of infra red transmitter 96 and infra red receiver 98, are preferable to be optimal for cost, power consumption, and data output features. Since the sensed receptacle is generally closed, the readings should not be affected by external light wave sources, such as fluorescent lights. The transmitter 96 and receiver 98 are relatively inexpensive discrete components that will not draw power when are not in use.

A 'beam' of infra red energy from transmitter 96 is 'bounced' off the top of the stack of material in receptacle 22 which is then received by receiver 98 can accurately measure the distance between the top of receptacle 26 and the top of the stack of material contained within receptacle 22. This analog voltage is then interpreted by an analog to digital convertor within microcontroller 66 to result in a precise value which can be sent in an alert message from microcontroller 66 though Wifi 72.

Another important automatic reading is the remaining battery 58 voltage which can, in a similar manner be interpreted by an analog to digital reading within microcontroller 66 which can also be sent in an alert message from microcontroller 66 though Wifi 72.

A sensor is of little value unless it can communicate cost and data efficiently, and is scalable. Many systems and protocols now known or hereinafter developed can be used. The efficiency of the data communication throughput directly affects battery life and hence the overall efficiency of the sensor system.

Figure 5:
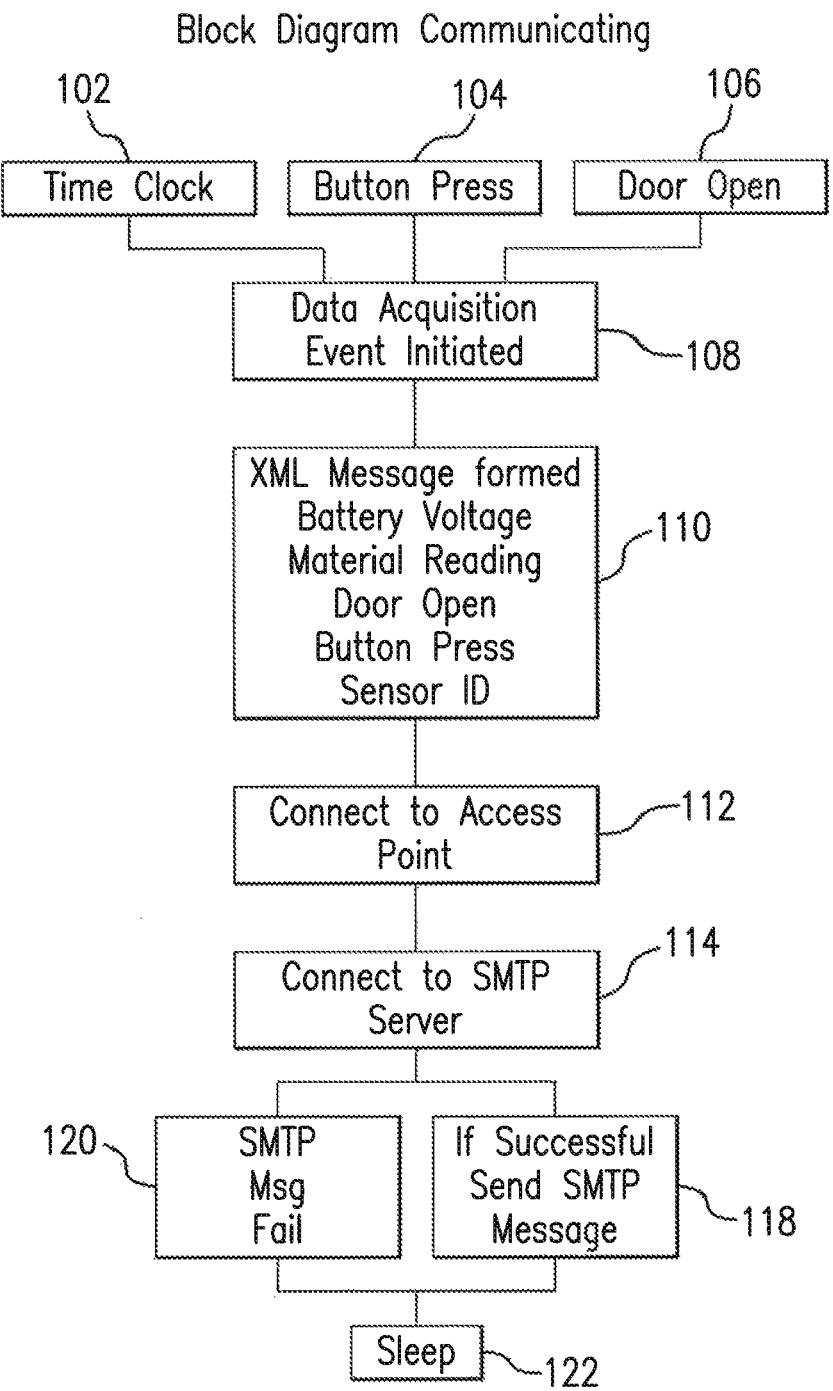
FIG. 5 is a block diagram of the sensor communications sequence.

Perhaps as important to efficiency is power saving modes during the vast majority of time that sensor 4 is not sensing or transmitting data. This idle mode is very critical to battery 58 life. Often the best power saving mode is to have microcontroller 66 turn off power to all peripheral units both within and external to microcontroller 66 and then for the firmware to place microcontroller 66 in a sleep mode which turns off the oscillator for minimum power drain. Referring to the sensing steps in FIG. 5, watch dog timer within microcontroller 66 is used to wake up microcontroller 66 from sleep mode on at least one of three events, which are time clock 102 sensing a preset time has passed, a button press 104 of momentary button 84, and/or a door open event 106. The watch dog timer will check, on a preset periodic basis, for any of these three events occurring. Once any one of the events has occurred, a data acquisition event 108 is initiated and the event or events that initiated the events are noted and placed in the outbound message transmitted by WiFi 72.

The clock time out 102 event can be simple or sophisticated based on need. In its simplest form, a simple microcontroller 66 register is loaded with a value, usually an integer, and periodically the register is decremented until the value is zero which initiates the data acquisition sequence 108. The time value is set in the microcontroller 66 and saved in eeprom 70 through a firmware menu accessed through USB port 80 wherein the data is interfaced with humans through a serial program running on a personal computer or similar interface device.

In a more sophisticated version, a real time calendar and clock with functions within microcontroller 66, and menu set through USB port 80, can choose days of the week and precise times to activate. In this way the most power intensive functions, the WiFi 72 functions, can be limited to, for example, to alternate days or to not trigger on weekends and holidays, when it is likely that no additional material was deposited in receptacle 22. The real time clock can be set to limit activations to only when absolutely necessary in order to preserve precious battery life.

Pressing momentary switch 84 acts as a positive verification that sensor 4 has been accessed and door 24 of receptacle 22 has been opened. Pressing switch 84 also tests the sensor and communication system for testing and troubleshooting purposes.

Many applications require an automatic alarm type of activation of the sensor sequence which is activated by magnetic door switch 90 being removed from proximity of magnet 92.

As stated above, it is very important to have the peripheral monitoring activities be supervised with the lowest possible current drain to preserve battery life.

There are many known methods for transmitting data over WiFi 72. The key requirements are simplicity, connection and time efficiency, cost, and scalability. After trying many methods, we found that having microcontroller 66 format an XMl, tagged message 110 with each of the data fields, such as bin material level, battery voltage level, sensor unique identifier, whether a button press and/or a door open event has occurred, etc. can all be done very efficiently in firmware by microcontroller 66. This message can be saved in sensor 4, for example in eeprom 70. The distance measuring sensors, such as infra red transmitter 96 and infra red receiver 98, are only powered for a short time periods during data acquisition event 108 to save battery power.

As each Wifi 72 unit has a worldwide unique identifier called a MAC address, firmware in microcontroller 66 quires and acquires WiFi unit 72 MAC address and places this information in an XML tag in the alert message. In this way, the sending unit is automatically identified by the WiFi 72 unit.

The next step in the sequence is for microcontroller 66 to power up and connect to access point 74 using the above described SSID and password, or in later connection attempts, to use the WPA2 hex key to save on connection power.

Once a connection has been made between microcontroller 66 and Wifi 72 and access point 74, the next step is to connect to an external server through the internet 76.

Sending the formatted message by SMTP email is very efficient. The MAC address is used as a component of the subject line. The XML formatted message is the body of the SMTP email. The SMTP connection details are set by the user in the menu through microcontroller 66 through the USB connection 80.

It is important for microcontroller 66 to monitor each step in the connection sequence and to stop an attempt and go back to sleep if the connection attempt has failed in order to preserve precious battery life. This self monitoring supervisory function is programmed as part of the firmware in microcontroller 66 firmware. As described above, audible piezo 220, and LED 94 indication of WiFi communications 72 are provided to effectively monitor communications status without external or sophisticated tools.

Microcontroller 66 will monitor the SMTP message transmission progress and will determine whether it was a success 118, or a failure 120, and will then, after logging the sequence status in eeprom 70, perhaps with day, date and time stamp if real time clock 124 is implemented, places sensor 4 back in sleep mode 122, until the next activation sequence. Alternately, the date and time stamp can be added by the server when it receives the message from sensor 4.

Optimally, the entire activation sequence through SMTP message formation and transmission and back to sleep should be less then 1 minute and perhaps less then 30 seconds. Efficiency in message formation and transmission will preserve battery life and directly increase efficiency.

By using a standard SMTP server for receiving sensor 4 data, all of the features required to manage data in a database, for example, a SQL database, are not required to be recreated. The SMTP server takes care of authentication issues and each individual email is essentially equivalent to a record in a traditional database. A major benefit is the ability to use the SMTP standard interface functions in place of complex SQL queries and therefore not having to format response reports to troubleshoot and review data. For example, a low level technician setting up a sensor 4 at a customer location will not only be able to see the message formatting and creation sequence by sensor 4 through USB connection 80, but will also be able to see each step in the connection to access point 74 and connection to the SMTP server 100, as well as whether the message was successfully transmitted. The technician will also be able to access the email account through a standard program such as Microsoft Outlook, and be able to easily search for and read the email without all of the security and technical requirements needed to access a standard online database. The technician can use standard email search features to look for the unique MAC address of sensor 4, which makes up a component of the SMTP message subject line. The SMTP server 100 day, date and time stamps each message. In this manner, many firewall and network security set up requirements are not required to implement this system.

Each message is usually less than 1 k bytes. Email accounts are amply available with many gigabits of storage for very reasonable fees each month. Email troubleshooting is usually provided by the email server host. It is for these reasons that this system of using email for data transmission and storage meets all of the requirements of operational cost and IT management efficiency, and hence is financially reasonable and scalable.

It will be understood that while SMTP email is a current communications protocol and system, that this overall system will be adaptable to future communications technologies currently existing or that will be invented in the future. This disclosure will focus on currently existing communications technology as representative of future technologies.

Figure 6:
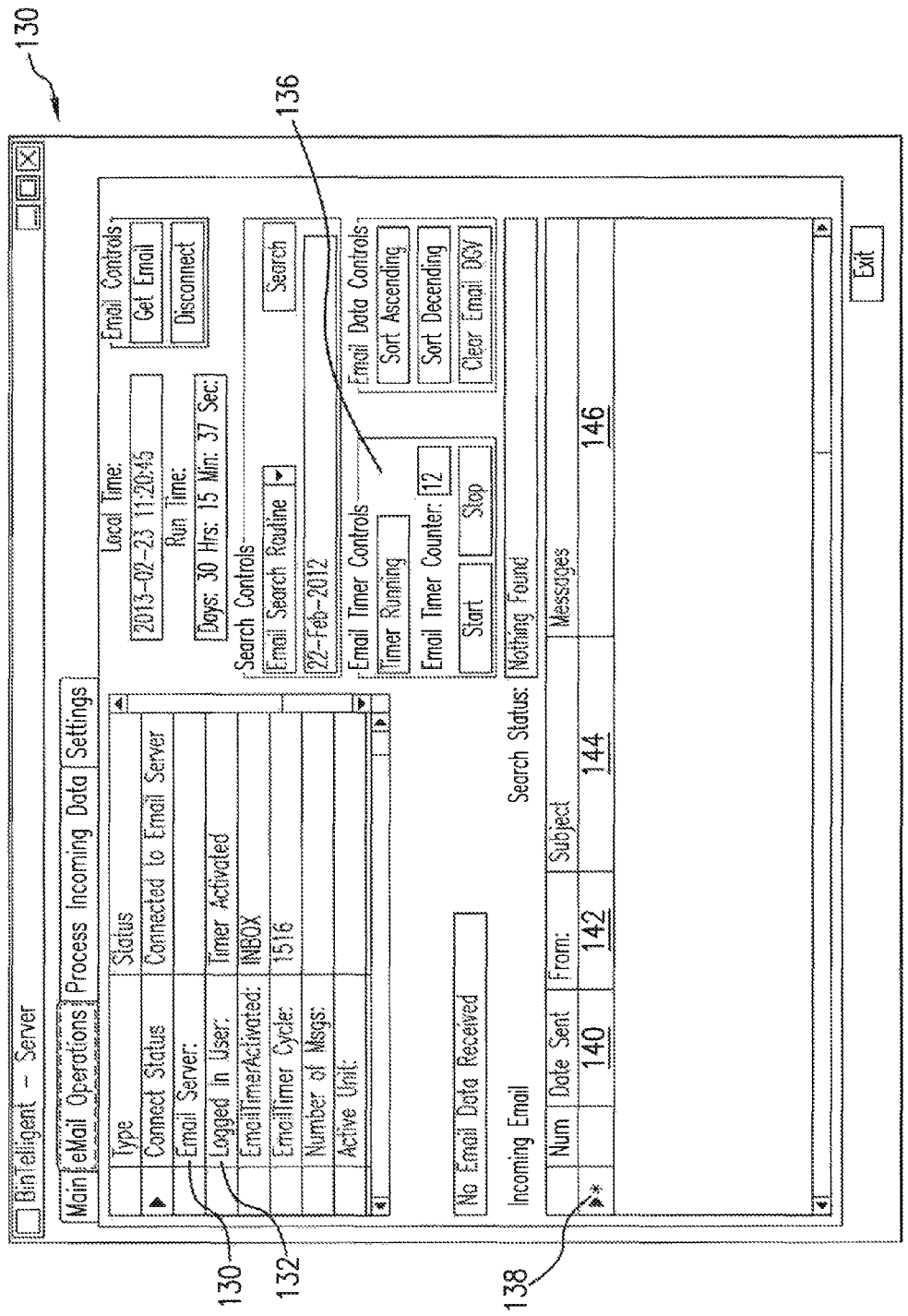
FIG. 6 is a screen shot of the post office program email operations functions.
Figure 7:
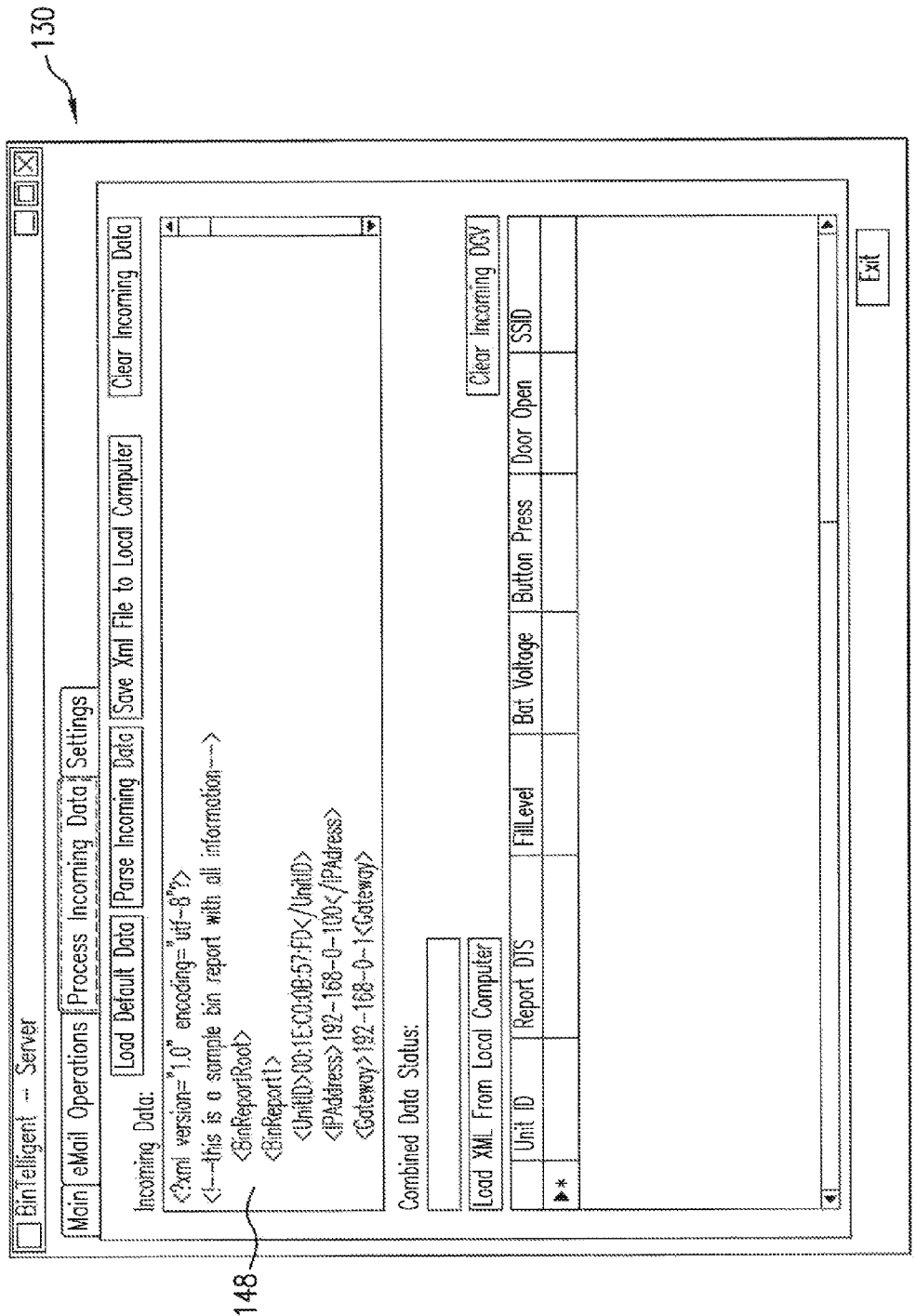
FIG. 7 is a screen shot of the post office program email sorting operations functions.

Once the sensor data is in XML format and arrives at an SMTP email server 100, a separate program called the post office 130 automatically 'reads' all new and unread emails and processes them. FIGS. 6 and 7 are screenshots of the post office program 130, generally. The function of the post office program 130 is to simply, and repeatedly, check the designated email account for new emails. When unread emails are found they are imported into post office program 130 and then the content is parsed. The data is then sorted and saved into a data storage server, similar to the functions provided by the post office of getting and sorting incoming letters and placing them into pigeon holes to be ready for final delivery. In this case these functions are all completed automatically and electronically by post office program 130.

Referring to FIG. 6, post office program 130 is configured with many parameters to enable the program to access and read email boxes including email server 132, logged in user 134, and various required connection details such as port numbers, passwords and reading time cycle counter 136. With each cycle, all new incoming email messages are read into incoming email grid 138 wherein each component of each email parsed, including date sent 140, from 142, subject 144, and message 146. As stated above, a key component of the subject line is the unique MAC address of the sending sensor.

Once each email message acquisition session is completed, post office program 130 then authenticates each new email and filters out any messages that are not permitted to be processed. Referring to FIG. 7, post office program 130 then further parses all incoming data 140, 142, 144, 146, 148 and creates and saves a separate XML file with day, date and time stamp, for each sensor 4 reading in a designated data storage server. Post office program 130 will automatically check for and create appropriate directories as needed to properly sort each reading for easy access by the interactive website program as shown in FIGS. 8-11, to be described herein. The data is stored in flat and small data files for easy data access and processing. Such a system is designed for cost efficiency and scalability.

Figure 8:
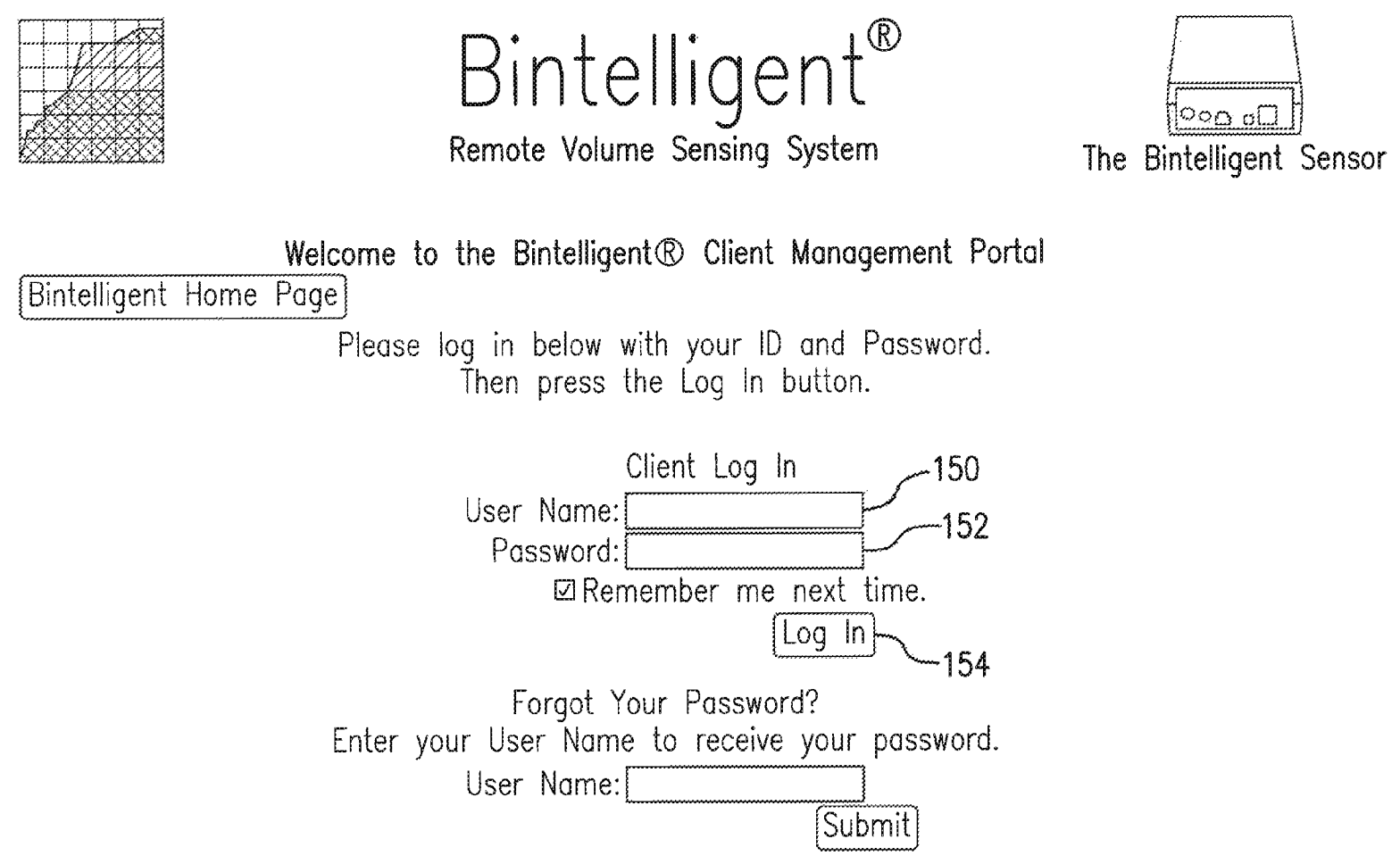

FIG. 8 is a screen shot of the secure client and administrative web site login page which requires a user to provide a user name 150, a password 152, and press login button 154. The site uses SSL and https for security purposes.

Figure 9:
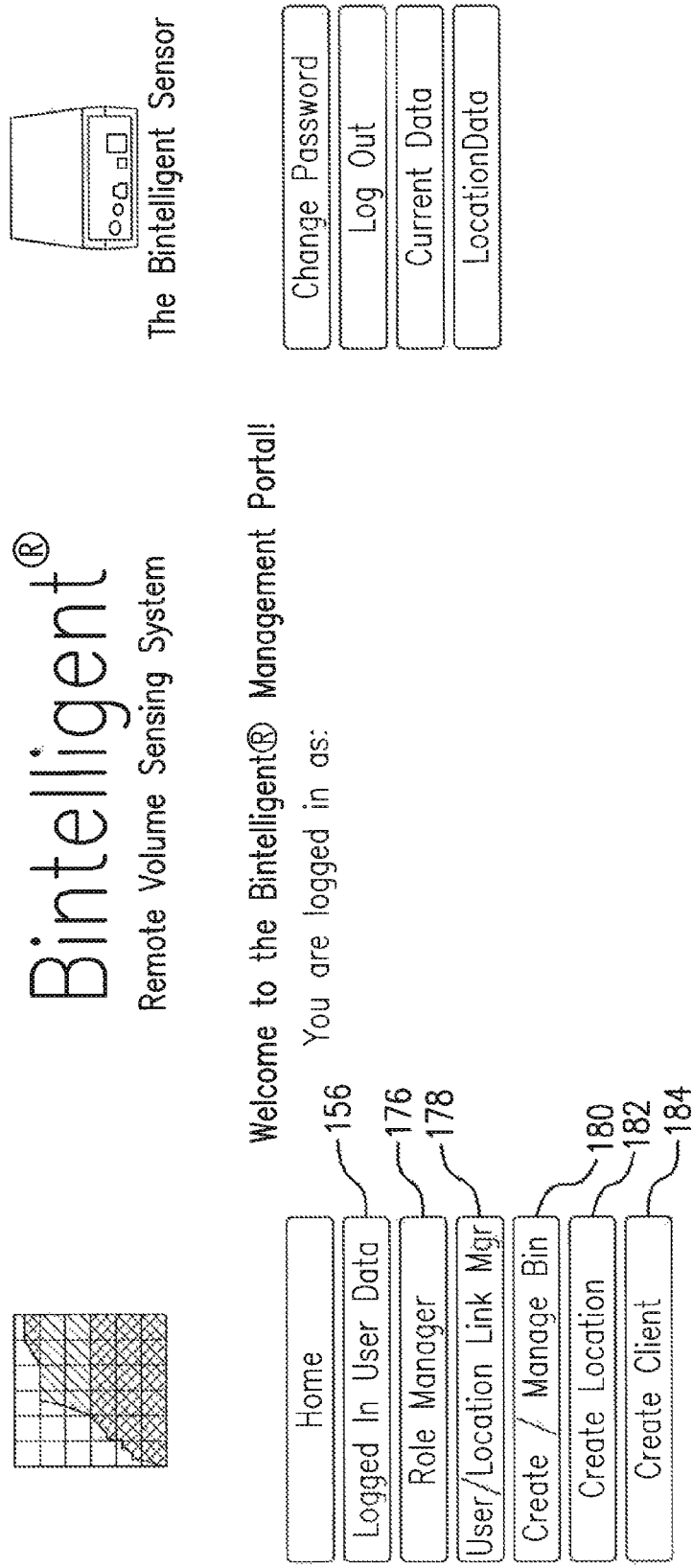
Figure 10:
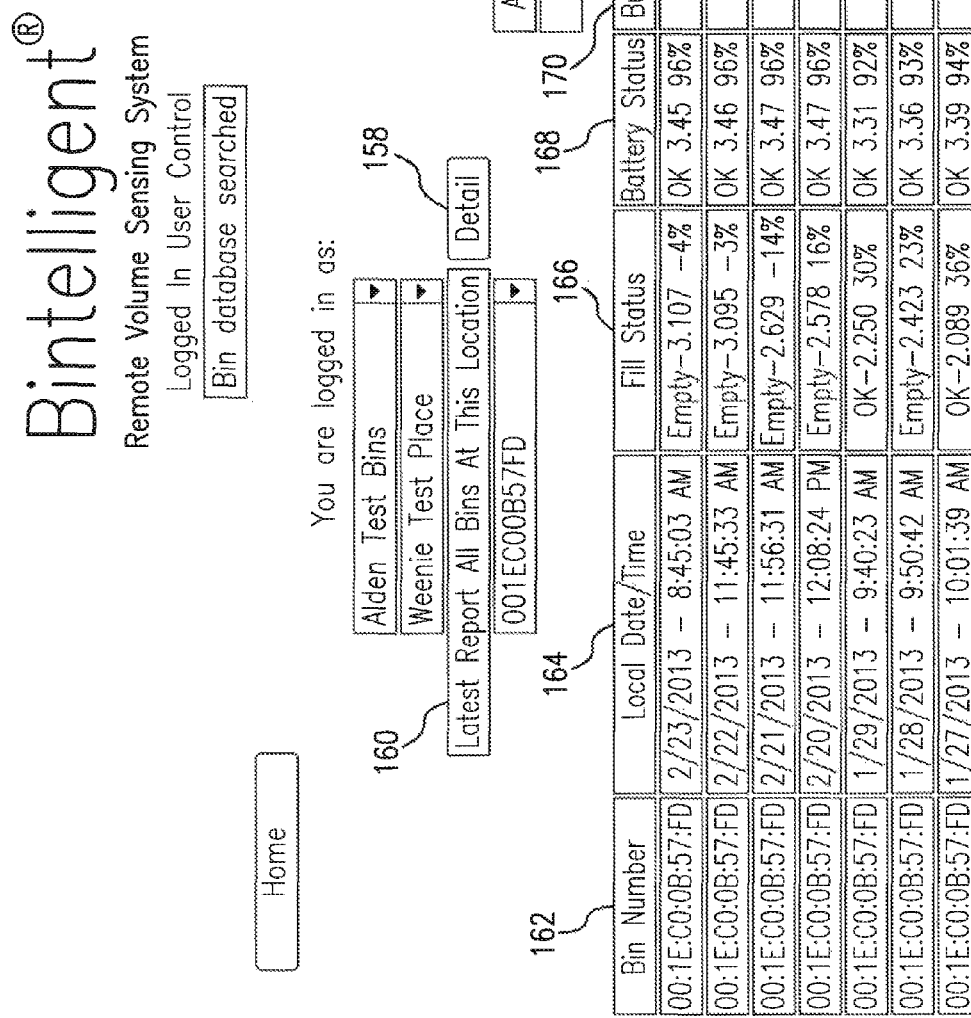
FIG. 10 is a screen shot of an interactive web interface sensor data history screen.
Figure 11:
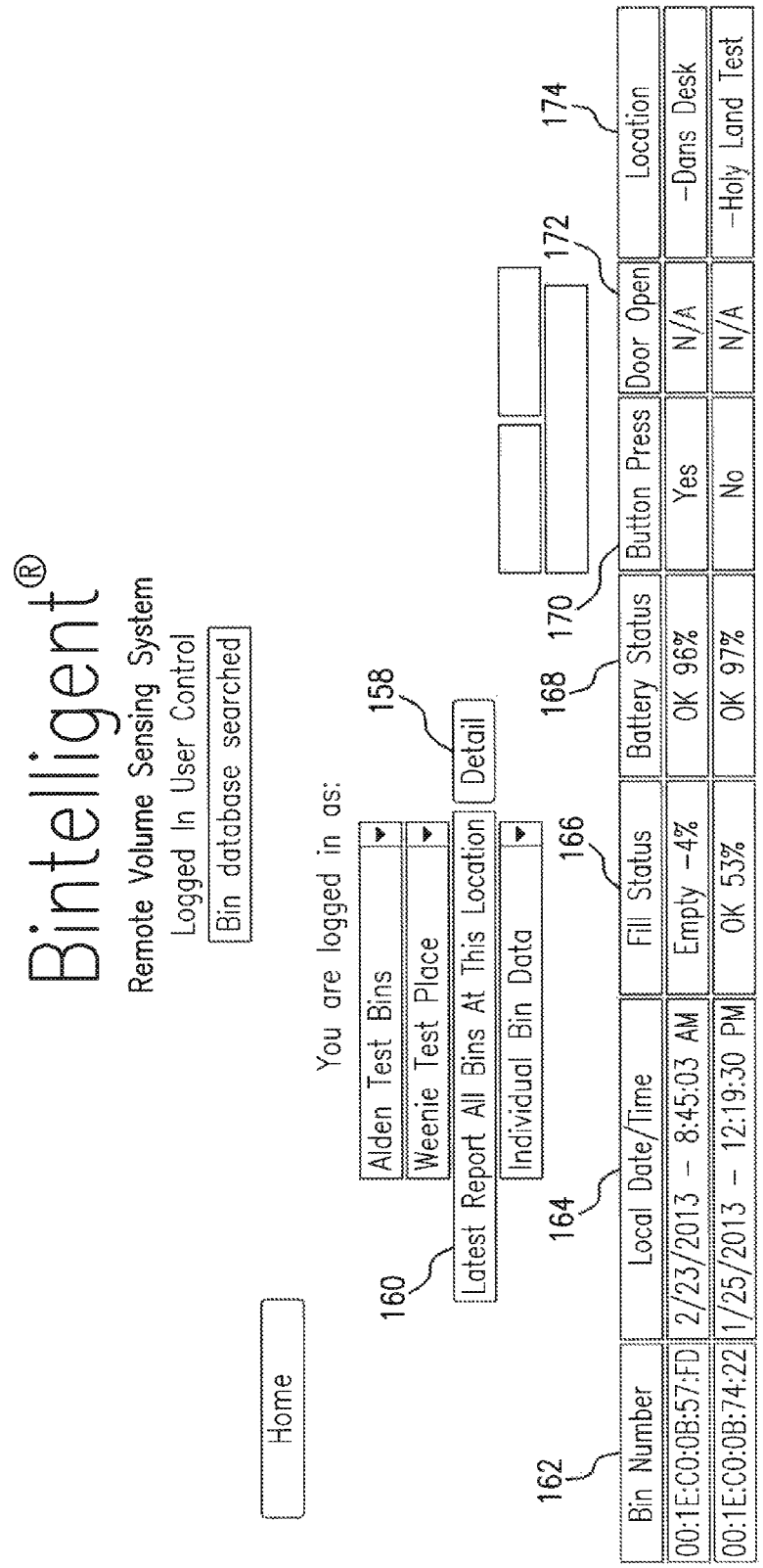
FIG. 11 is a screen shot of an interactive web interface last sensor report for all sensors at one location.

Referring to FIG. 9, once a user has successfully logged in, the user's assigned role is verified by the web site. If the user is not an administrator, the user is permitted by the web site to see only the sensor information assigned to that user when that user clicks the Logged In User Data 156 button. The user is then displayed a web page, FIGS. 10 and 11, that lets the user choose the locations of sensors 4 assigned to that user. The information can be a history of the readings from a specific sensor 4 by pressing Details button 158, or the Latest Report for All Bins At This Location 160 button. FIG. 10 is a history report by pressing Details button 158. FIG. 11 is a report on the Latest Report All Bins At This Location 160 button.

Color highlighted information displayed in case includes Bin Number (Mac Address) 162, Day/TimeStamp 164, receptacle fill status 166, battery status 168, button press 170, door open 172 and sensor firmware revision information.

If the user has been assigned an administrator role, referring to FIG. 9, the user/administrator will be given access to administrator functions including assigning users to roles using the Role Manager button 176, assign User/Location Link Manager 178, Create/Manage Bin 180, Create Location 182 and Create Client 184 functions.

While the sensors 4 provide a great deal of information that is automatically accessible from the web site, as shown in FIGS. 9-11, this information, without the ability to have it automatically analyzed for maintenance issues, and/or the ability to extract current status information for input into other systems will severely limit the usefulness of the system in commercial applications and large scale operation. Accordingly, other administrative and data functions of the system include the ability to automatically report on the status of all sensors in the system, including location, battery, fill level and location and the ability to output this information, filtered as necessary to be useful, for example by zip code, in data formats to be useful, such as in XML format to be automatically input into billing and/or route scheduling programs to assist in administering the entire business process. The system will send alerts, by text and email, or by other communications now known or invented in the future, to automatically alert users and administrators of important operational events.

This precise information will assist in not only keeping the business profitable, but also in saving time, money and precious energy by sending fewer resources to check empty receptacles 22. Additionally, routes will be more efficiently planned based on reviewing only those receptacles 22 that require service, and customers will be happier as when a bin is approaching full level the bin will actually, in effect, schedule its next service call automatically.

As should be generally understood, a computing device may be utilized for performing various steps and displaying the various information as disclosed herein. The computing device can take any appropriate form, such as a personal computer, smartphone, desktop, laptop, PDA, tablet, or other computing device. The computing device includes appropriate input and output devices, such as a display screen, touch screen, touch pad, data entry keys, speakers, and/or a microphone suitable for voice recognition. A user can perform steps, provide inputs and/or receive outputs in accordance with the present disclosure by, for example, accessing computing device. The computing device can then perform the various steps and functions as disclosed herein and provide outputs, such as those provided in FIGS. 6 through 11, to the user through any suitable output device, such as a display screen.

The computing device includes a processor(s) and a memory, and may include for example server 100. The processor(s) can be any known or future invented processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory can also include data that may be retrieved, manipulated, or stored by processor(s). For instance, memory can store data points, formulas, equations, and other suitable data required to perform the various steps as disclosed herein.

It is to be understood that while certain forms of the present invention have been illustrated and described herein, it is not to be limited to the specific forms or arrangement of parts described and shown. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A low power remote consumption volumetric sensing and reporting system comprising:

at least one linear sensing device with an electronic output;

a battery source of voltage electrically connected to said linear sensing device;

a microcontroller for processing said electrical output from said linear sensing device;

a nonvolatile memory connected to said microcontroller for storing settings and sensed data;

a low power WiFi connection device connected to said microcontroller for intermittently transmitting said sensed data;

wherein each WiFi connection device has a unique identification number;

a storage receptacle for receiving and storing material having an input area for receiving material, said storage receptacle defining an area for containment of material input into said storage receptacle;

wherein said linear sensing device is connected to a top of said storage receptacle and wherein said linear sensing device measures a linear distance between a top of said material in said storage receptacle and said top of said storage receptacle;

a WiFi access point for intermittently connecting to said low power WiFi connection device for receiving said sensed data;

a server electronically connected to said WiFi access point for receiving said sensed data;

a post office computer program application running on said server that automatically receives said sensed data and stores said sensed data on said server for additional processing;

an interactive interface electrically connected to said server for selecting, analyzing and displaying said sensed data in a user defined graphical interactive format;

wherein said post office computer program application automatically detects all said receptacles having data that have not been set up as a receptacle in the system through their respective said WiFi connection device unique identification number; and wherein said post office computer program application automatically detects all said receptacles having data that have not been linked to any said WiFi access point location.

2. The low power remote consumption volumetric sensing and reporting system, as set out in claim 1, wherein said linear sensing device comprises an infrared transmitter, an infrared receiver and an analog signal amplifier circuit each connected to an analog to digital convertor in said microcontroller for converting the analog voltage output from said linear sensing device to a corresponding digital value for transmission to said server for further analysis and processing wherein said infrared transmitter bounces an infrared beam from said top of said receptacle onto said top of said material stored in said receptacle and the relative strength of said reflected infrared beam is received by said infrared receiver and said analog electrical voltage output from said infrared receiver is amplified and smoothed by said amplifier and said amplified and smoothed analog signal is electrically input into said microcontroller and is converted to a digital value corresponding to the linear distance between said top of said storage receptacle and said top of said material contained within said storage receptacle.

3. The low power remote consumption volumetric sensing and reporting system, as set out in claim 1, further comprising a momentary switch connected to said microcontroller for testing said linear sensing device functions and for accessing interactive menus for configuring said microcontroller.

4. The low power remote consumption volumetric sensing and reporting system, as set out in claim 1, wherein at least one sidle or top of said storage receptacle is intermittently moveable from a closed to an open position and further comprising a sensor connected to said movable side or top of said storage receptacle and is electrically connected to said microcontroller for sensing and reporting whether said side or top is in said open or closed position.

5. The low power remote consumption volumetric sensing and reporting system, as set out in claim 1, further comprising an analog to digital battery voltage sensor connected to said microcontroller for reporting the current battery voltage.

6. The low power remote consumption volumetric sensing and reporting system, as set out in claim 1, wherein said sensed and analyzed data is formatted in an XML format with data tag surrounding each field to facilitate further analysis of said reported data.

7. The low power remote consumption volumetric sensing and reporting system, as set out in claim 6, wherein said sensed data is formatted and transmitted in an SMTP email and wherein said unique identification number of said WiFi transmitter is a recoverable component of the subject field of said SMTP message and wherein said XML formatted report is contained in the body portion of said SMTP email.

8. The low power remote consumption volumetric sensing and reporting system, as set out in claim 1, wherein said report contains said linear distance measurement, said battery voltage, whether said button has been pressed, and whether said door has been opened.

9. The low power remote consumption volumetric sensing and reporting system, as set out in claim 1, wherein said sensor further comprises a serial data interface electrically connected to said microcontroller for providing diagnostics from each said sensor operation.

10. The low power remote consumption volumetric sensing and reporting system, as set out in claim 9, wherein said serial interface is a USB electrical connection connected to said microcontroller.

11. The low power remote consumption volumetric sensing and reporting system, as set out in claim 9, wherein each step in the WiFi connection between said WiFi transmitter and said access point and said server and said data transmission is monitored and output from said serial data interface to diagnose connectivity and data transmission progress and issues.

12. The low power remote consumption volumetric sensing and reporting system, as set out in claim 1, wherein said WiFi connection is encrypted with WPA2 security.

13. The low power remote consumption volumetric sensing and reporting system, as set out in claim 12, wherein the WiFi hex key from WPA2 security is stored in said non volatile memory to speed WiFi connectivity to save said battery life.

14. The low power remote consumption volumetric sensing and reporting system, as set out in claim 1, wherein said microcontroller further comprises firmware and wherein said firmware in said microcontroller is field flash upgradeable.

15. The low power remote consumption volumetric sensing and reporting system, as set out in claim 1, wherein said microcontroller powers down into a software sleep mode to preserve battery life.

16. The low power remote consumption volumetric sensing and repotting system, as set out in claim 1, further comprising a real time clock to set volume scan time cycle.

17. The low power remote consumption volumetric sensing and reporting system, as set out in claim 1, further comprising a watch dog timer to prevent system jamming.

18. The low power remote consumption volumetric sensing and reporting system, as set out in claim 1, wherein said interactive web interface further comprises a user login interface wherein said web interface selectively permits access to client location data authorized for the logged in user.

19. The low power remote consumption volumetric sensing and reporting system, as set out in claim 1, wherein said web interface automatically detects all said receptacles having data that have not been set up as a receptacle in the system and creates and sends an alert message.

20. The low power remote consumption volumetric sensing and reporting system, as set out in claim 1, wherein said web interface automatically detects all said receptacles having data that have not been linked to any said access point location and creates and sends an alert message.

21. The low power remote consumption volumetric sensing and reporting system, as set out in claim 1, wherein said post office computer program automatically accesses an email account on a timed cycle, reads and downloads all unread emails from said post office computer program application, determines said WiFi connection device unique identifier number, verifies whether a directory exists for information from said unique identifier, and saves the new information in and XML formatted file in the existing directory, or first creates a new directory and then saves in new information in the created directory.

22. The low power remote consumption volumetric sensing and reporting system, as set out in claim 21, wherein each directory name is said WiFi connection device unique identification number.

23. The low power remote consumption volumetric sensing and reporting system, as set out in claim 21, wherein each file name is said WiFi connection device unique identification number followed by the 'dot' XML suffix.

24. The low power remote consumption volumetric sensing and reporting system, as set out in claim 1, wherein said interactive web interface has an administrative login permission level to permit administrators to remotely set up, access, analyze and adjust data stored on the remote computer.

25. The low power remote consumption volumetric sensing and reporting system, as set out in claim 24, wherein administrators, through said interactive web interface, remotely assign bin parameters to said WiFi connection device unique identification number.

26. The low power remote consumption volumetric sensing and reporting system, as set out in claim 24, wherein administrators, through said interactive web interface, remotely create customer accounts on said remote computer indexed to said WiFi connection device unique identification number.

27. The low power remote consumption volumetric sensing and reporting system, as set out in claim 26, wherein administrators, through said interactive web interface, remotely create customer locations, indexed to a said customer, on said remote computer indexed to said WiFi connection device unique identification number.

28. The low power remote consumption volumetric sensing and reporting system, as set out in claim 26, wherein administrators, through said interactive web interface, remotely tie a said customer location, to said WiFi connection unique identification number, on said remote computer.

29. The low power remote consumption volumetric sensing and reporting system, as set out in claim 26, wherein said interactive web interface can display the latest sensed data for each storage bin at a location.

30. The low power remote consumption volumetric sensing and reporting system, as set out in claim 26, wherein said interactive web interface can display a selectable set of sensed data for each storage bin at a location.

31. The low power remote consumption volumetric sensing and reporting system, as set out in claim 26, wherein said interactive web interface further comprises a selectable set of sensed data that includes battery voltage of the sensor.

32. The low power remote consumption volumetric sensing and reporting system, as set out in claim 26, wherein said interactive web interface further comprises a selectable set of sensed data includes whether the button on the sensor has been pressed.

33. The low power remote consumption volumetric sensing and reporting system, as set out in claim 26, wherein said interactive web interface wherein said selectable set of sensed data includes whether the door has been opened.

34. The low power remote consumption volumetric sensing and reporting system, as set out in claim 26, wherein said door sensor is a magnetic reed switch.

35. The low power remote consumption volumetric sensing and reporting system, as set out in claim 1, further comprising data analyzing and reporting systems, wherein said sensed data is output for additional processing into said data analyzing and reporting systems.

36. The low power remote consumption volumetric sensing and reporting system, as set out in claim 1, further comprising a circuit to boost or limit battery voltage to extend battery life.

37. The low power remote consumption volumetric sensing and reporting system, as set out in claim 1, further comprising data analyzing and reporting systems, wherein said sensed data is used to create routing reports to service said storage bins utilizing said data analyzing and reporting systems.

38. The low power remote consumption volumetric sensing and reporting system, as set out in claim 1, wherein said data storage is automatically archived and deleted by said server software as required for automatic server maintenance.

39. The low power remote consumption volumetric sensing and reporting system, as set out in claim 1, further comprising an audible indication of communications connections status and message processing status and microcontroller activity status.

40. The low power remote consumption volumetric sensing and reporting system, as set out in claim 1, further comprising a visual indication of communications connections status and message processing status and microcontroller activity status.

* * * * *